United States Patent
Fukuya et al.

(10) Patent No.: US 8,760,541 B2
(45) Date of Patent: Jun. 24, 2014

(54) SHOOTING APPARATUS AND MODE SETTING METHOD FOR CONTROLLING A SHOOTING MODE OF A SHOOTING APPARATUS

(75) Inventors: Yoshiyuki Fukuya, Sagamihara (JP); Osamu Nonaka, Sagamihara (JP)

(73) Assignee: Olympus Imaging Corp. (JP)

( * ) Notice: Subject to any disclaimer, the term of this patent is extended or adjusted under 35 U.S.C. 154(b) by 42 days.

(21) Appl. No.: 13/587,477

(22) Filed: Aug. 16, 2012

(65) Prior Publication Data

US 2013/0050531 A1    Feb. 28, 2013

(30) Foreign Application Priority Data

Aug. 31, 2011    (JP) ................. 2011-189705

(51) Int. Cl.
 *H04N 5/262*  (2006.01)
 *H04N 5/225*  (2006.01)
 *H04N 5/76*   (2006.01)

(52) U.S. Cl.
 USPC .............. 348/239; 348/220.1; 348/231.2

(58) Field of Classification Search
 USPC .................... 348/239, 220.1, 231.2
 See application file for complete search history.

(56) References Cited

U.S. PATENT DOCUMENTS

| | | | |
|---|---|---|---|
| 7,990,423 B2 * | 8/2011 | Misawa | 348/220.1 |
| 2007/0115366 A1 * | 5/2007 | Tsubaki | 348/220.1 |
| 2008/0174667 A1 * | 7/2008 | Okada et al. | 348/220.1 |
| 2010/0039499 A1 * | 2/2010 | Nomura et al. | 348/43 |
| 2010/0321533 A1 * | 12/2010 | Park et al. | 348/239 |
| 2011/0025865 A1 * | 2/2011 | Kunishige et al. | 348/220.1 |

FOREIGN PATENT DOCUMENTS

JP    2010-268019    11/2010

* cited by examiner

*Primary Examiner* — Sinh Tran
*Assistant Examiner* — Shahbaz Nazrul
(74) *Attorney, Agent, or Firm* — Volpe and Koenig, P.C.

(57) ABSTRACT

A shooting apparatus includes: an image-pickup section outputting a picked-up image obtained by picking up an image of a subject; and a control section performing acceptance of a still image shooting operation and acceptance of a part specification operation of specifying a partial area of the picked-up image during video image pickup by the image-pickup section.

6 Claims, 17 Drawing Sheets

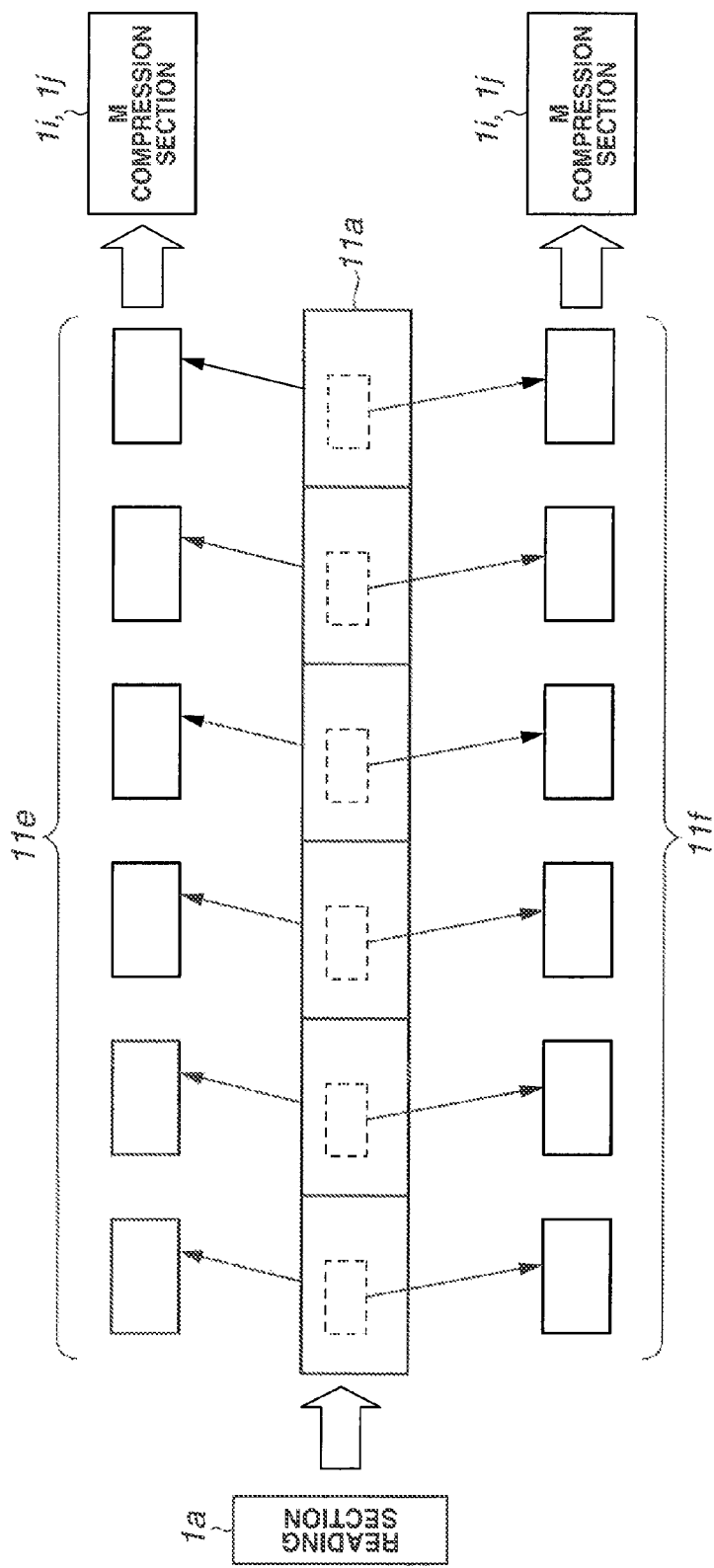

FIG.5A
FIG.5B
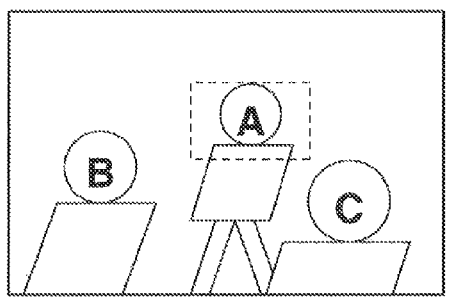
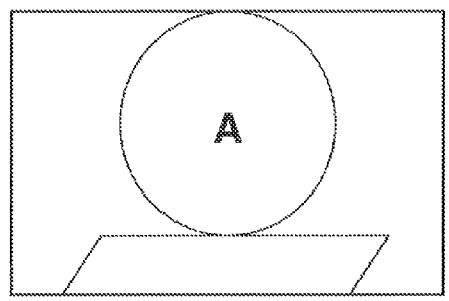

FIG.9A
FIG.9B
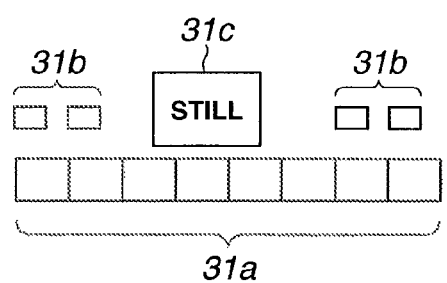
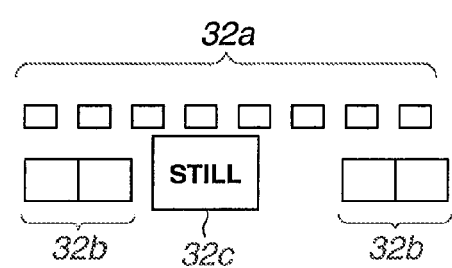

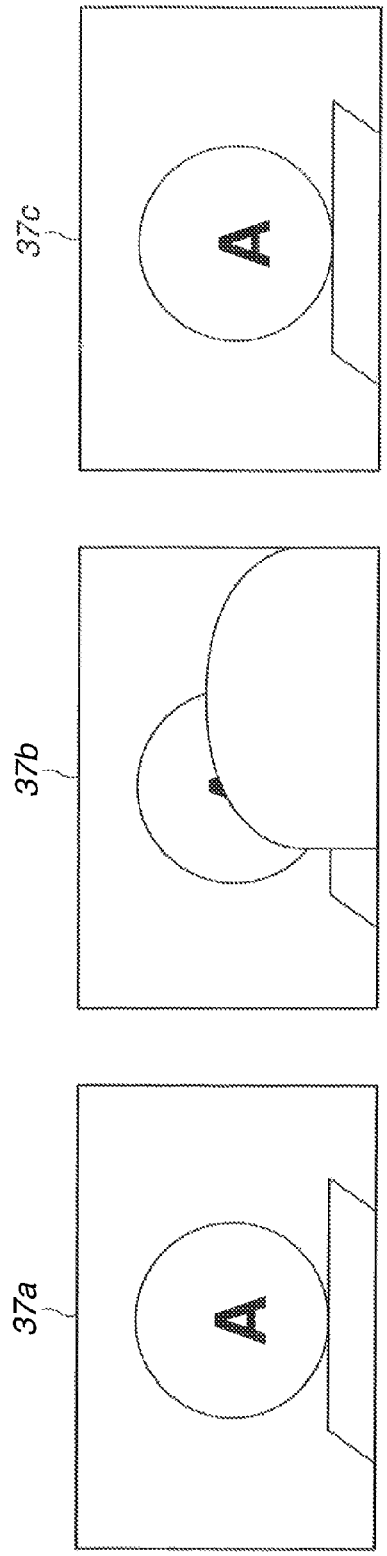

SHOOTING APPARATUS AND MODE SETTING METHOD FOR CONTROLLING A SHOOTING MODE OF A SHOOTING APPARATUS

CROSS REFERENCE TO RELATED APPLICATION

This application claims benefit of Japanese Application No. 2011-189705 filed in Japan on Aug. 31, 2011, the contents of which are incorporated by this reference.

BACKGROUND OF THE INVENTION

1. Field of the Invention

The present invention relates to a shooting apparatus having a photo in movie mode and a multi-frame mode.

2. Description of the Related Art

Recently, a portable apparatus provided with a shooting function (a shooting apparatus) such as a digital camera is provided with various shooting functions, with free use of image processing. For example, Japanese Patent Application Laid-Open Publication No. 2010-268019 discloses a shooting apparatus having a function of combining and recording an image shot on the wide angle side in order to grasp the whole atmosphere and an image shot on the telephoto side in order to grasp an impressive moment and displaying the two images on one screen.

There are a lot of shooting apparatuses having not only a still image shooting function but also a video shooting functions. For example, a shooting apparatus provided with a so-called photo in movie function of shooting a still image during video shooting is widely known. Furthermore, there is also a shooting apparatus provided with a so-called reminiscence photo function of recording a still image and video before and after the still image by pressing a shutter button. Furthermore, there is also a shooting apparatus provided with a so-called multi-frame function of recording two kinds of videos, a video in a screen obtained by resizing the whole screen and a video in a partial screen, as videos.

SUMMARY OF THE INVENTION

A shooting apparatus according to an aspect of the present invention is provided with: an image-pickup section outputting a picked-up image obtained by picking up an image of a subject; and a control section performing acceptance of a still image shooting operation and acceptance of a part specification operation of specifying a partial area of the picked-up image during video image pickup by the image-pickup section.

A shooting apparatus according to another aspect of the present invention is provided with: an image-pickup section outputting a picked-up image obtained by picking up an image of a subject; a control section accepting a part specification operation of specifying a partial area of the picked-up image; and a recording section being controlled by the control section to record still images based on a whole image based on the picked-up image, a partial image based on the partial area of the picked-up image, a composite image with the whole image as the main image and a composite image with the partial image as the main image when a still image shooting operation is performed after the part specification operation.

A mode setting method according to an aspect of the present invention is a mode setting method for controlling a shooting mode of a shooting apparatus provided with an image-pickup section and a control section controlling the image pick-up section, the method including the steps of: the image-pickup section outputting a picked-up image obtained by picking up an image of a subject; the control section accepting a still image shooting operation during video image pickup by the image-pickup section; and the control section accepting a part specification operation of specifying a partial area of the picked-up image during video image pickup by the image pick-up section.

A mode setting method according to another aspect of the present invention is a mode setting method for controlling a shooting mode of a shooting apparatus provided with an image-pickup section, a control section controlling the image pick-up section and accepting a part specification operation of specifying a partial area of a picked-up image and a recording section, the method including the steps of: the recording section being controlled by the control section to record still images based on a whole image based on the picked-up image, a partial image based on the partial area of the picked-up image, a composite image with the whole image as the main image and a composite image with the partial image as the main image when a still image shooting operation is performed after the part specification operation.

The above and other objects, features and advantages of the invention will become more clearly understood from the following description referring to the accompanying drawings.

BRIEF DESCRIPTION OF THE DRAWINGS

FIG. 4 is an explanatory diagram showing an operation of a multi-frame mode;

FIGS. 5A and 5B are explanatory diagrams showing an example of an input image and a partial image;

FIGS. 9A and 9B are explanatory diagrams for illustrating operations of the second embodiment;

FIGS. 11A to 11C are explanatory diagrams for illustrating an operation of the second embodiment;

DETAILED DESCRIPTION OF THE PREFERRED EMBODIMENTS

Embodiments of the present invention will be described below with reference to drawings.

(First Embodiment)

Figure 1:
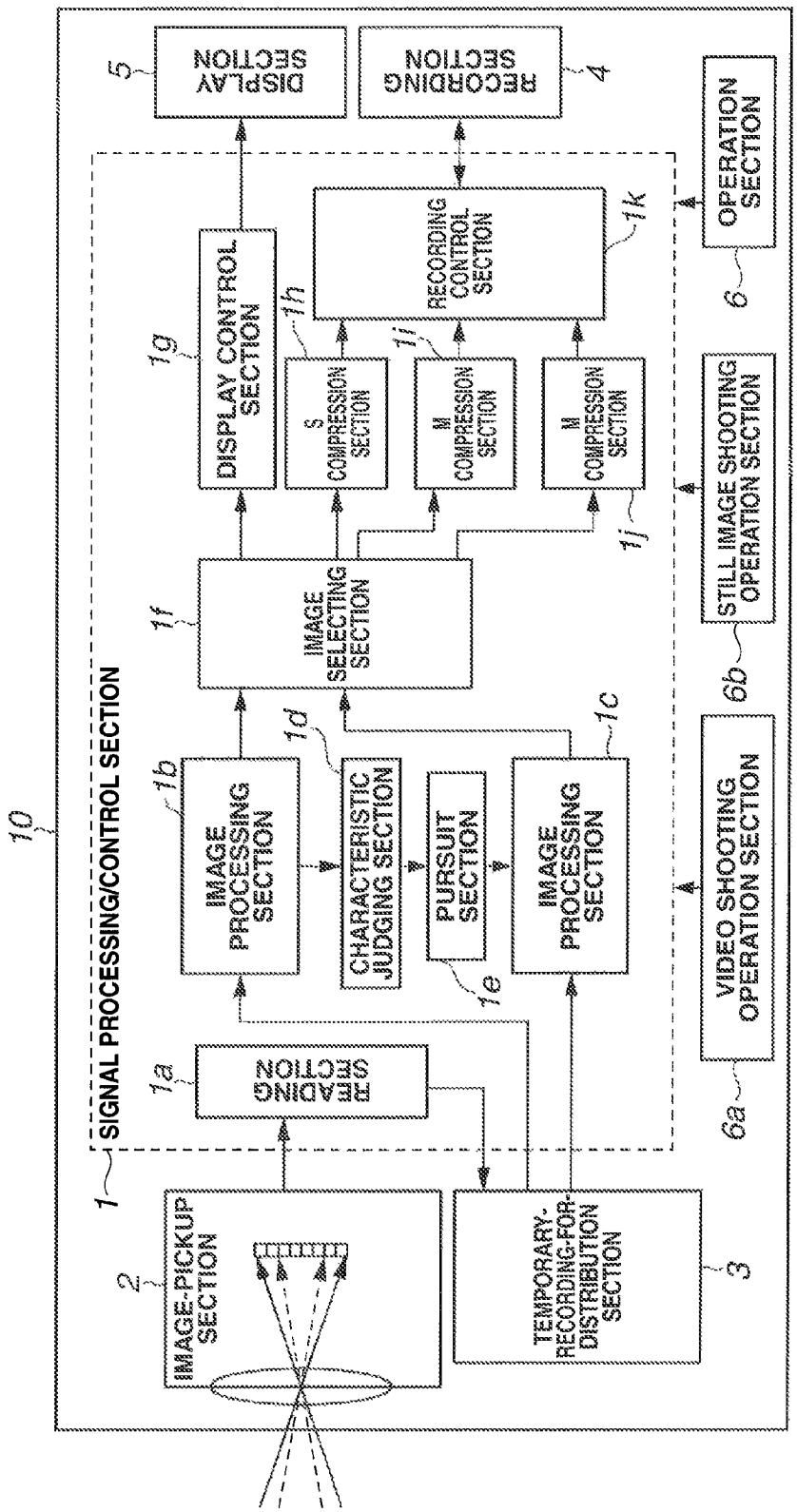
FIG. 1 is a block diagram showing a circuit configuration of a shooting apparatus according to a first embodiment of the present invention.

FIG. 1 is a block diagram showing a circuit configuration of a shooting apparatus according to a first embodiment of the present invention.

In FIG. 1, a shooting apparatus 10 has an image pickup section 2 configured by an image pickup device such as a CCD or CMOS sensor. The image pickup section 2 is configured so that aperture, focus, zoom and the like can be controlled by a signal processing/control section 1, and is capable of performing image pickup corresponding to various compositions and subjects.

The image pickup section 2 is drive-controlled by the signal processing/control section 1 to shoot a subject and output a picked-up image. The signal processing/control section 1 outputs an image-pickup device drive signal to the image pickup section 2 and reads a picked-up image from the image pickup section 2. The acquisition of the picked-up image is performed by a reading section 1a. The rending section 1a gives the picked-up image read from the image pickup section 2, to a temporary-recording-for-distribution section 3.

The temporary-recording-for-distribution section 3 has a capacity for storing picked-up images from the image pickup section 2 for a predetermined time period. The temporary-recording-for-distribution section 3 stores and retains picked-up images (videos and still images) read from the image pickup section 2.

The signal processing/control section 1 has image processing sections 1b and 1c of two systems, which read and image-process a picked-up image recorded in the temporary-recording-for-distribution section 3. The image processing sections 1b and 1c perform predetermined signal processes, for example, color signal generation processing, matrix conversion processing and other various signal processes for an inputted image. Furthermore, the image processing sections 1b and 1c are configured to be also capable of performing various image processes such as resizing processing for resizing an inputted image and processing for generating an image of a partial area of an inputted image (hereinafter referred to as a partial image). Hereinafter, an image of the whole area of an inputted image will be referred to as a whole image irrespective of whether resizing processing has been performed therefor or not.

When an operation of specifying a partial area (hereinafter referred to as a specified partial area) of an inputted image (hereinafter referred to as a part specification operation) is performed by a user to generate a partial image, a characteristic judging section 1d is given image information about the specified partial area from the image processing section 1b. The characteristic judging section 1d judges a feature value of a target subject such as a person's face and outputs a judgment result to a pursuit section 1e as information about the target subject detected in the specified partial area. The pursuit section 1e pursues an area which includes a part where the feature value of the target subject matches in sequentially inputted input images and outputs a pursuit result to the image processing section 1c. In this way, the image processing section 1c is adapted to, when a target subject is specified by a part specification operation, be always able to pursue an image part which includes this target subject and generate the image part as a partial image.

Video images and still images from the image processing sections 1b and 1c are given to an image selecting section 1f.

The image selecting section 1f selects an inputted video image and a still image, gives them to a display control section 1g and also gives them to an S compression section 1h and M compression sections 1i and 1j.

The display control section 1g performs display processing for giving the inputted video image and still image to a display section 5 to display them. The display section 5 is configured by an LCD or the like, and it displays the video image or still image given from the display control section 1g.

On the other hand, the S compression section 1h compresses the inputted still image and gives it to a recording control section 1k. The M compression sections 1i and 1j compress the inputted video image and give it to the recording control section 1k. The recording control section 1k gives the compressed video image and still image to a recording section 4 to record them. The recording section 4 is controlled by the recording control section 1k to record the compressed video image and still image which have been inputted. For example, a card interface can be adopted as the recording section 4. The recording section 4 is capable of recording image information, voice information and the like to a recording medium such as a memory card.

The shooting apparatus 10 is also provided with an operation section 6. The operation section 6 has various switches and buttons for setting of a shooting mode and the like. The operation section 6 generates an operation signal based on a user operation and provides the operation signal to the signal processing/control section 1. For example, FIG. 1 shows a video shooting operation section 6a and a still image shooting operation section 6b as an example of the operation section 6. The video shooting operation section 6a is for instructing video shooting. By the video shooting operation section 6a being operated, an operation signal for starting video shooting is provided for the signal processing/control section 1. The still image shooting operation section 6b is for instructing still image shooting. By the still image shooting operation section 6b being operated, an operation signal for starting still image shooting is provided for the signal processing/control section 1. The signal processing/control section 1 controls each section on the basis of the operation signal.

Furthermore, a touch panel can be also adopted as the operation section 6. For example, by providing a touch panel as the operation section 6, on a display screen of the display section 5, an operation signal corresponding to a position on the display screen at which the user points with a finger can be generated. Thereby, the user can easily perform an operation of specifying a predetermined area in an image displayed on the display screen of the display section 5 as a specified partial area.

By controlling each section, the signal processing/control section 1 sets a shooting mode based on a user operation and realizes a shooting function corresponding to each shooting mode. In this case, the signal processing/control section 1 is adapted to be able to change the shooting mode only by operating the video shooting operation section 6a and the still image shooting operation section 6b.

Next, operations of the embodiment configured as described above will be described with reference to FIG. 2 to FIGS. 7A and 7B.

Figure 2:
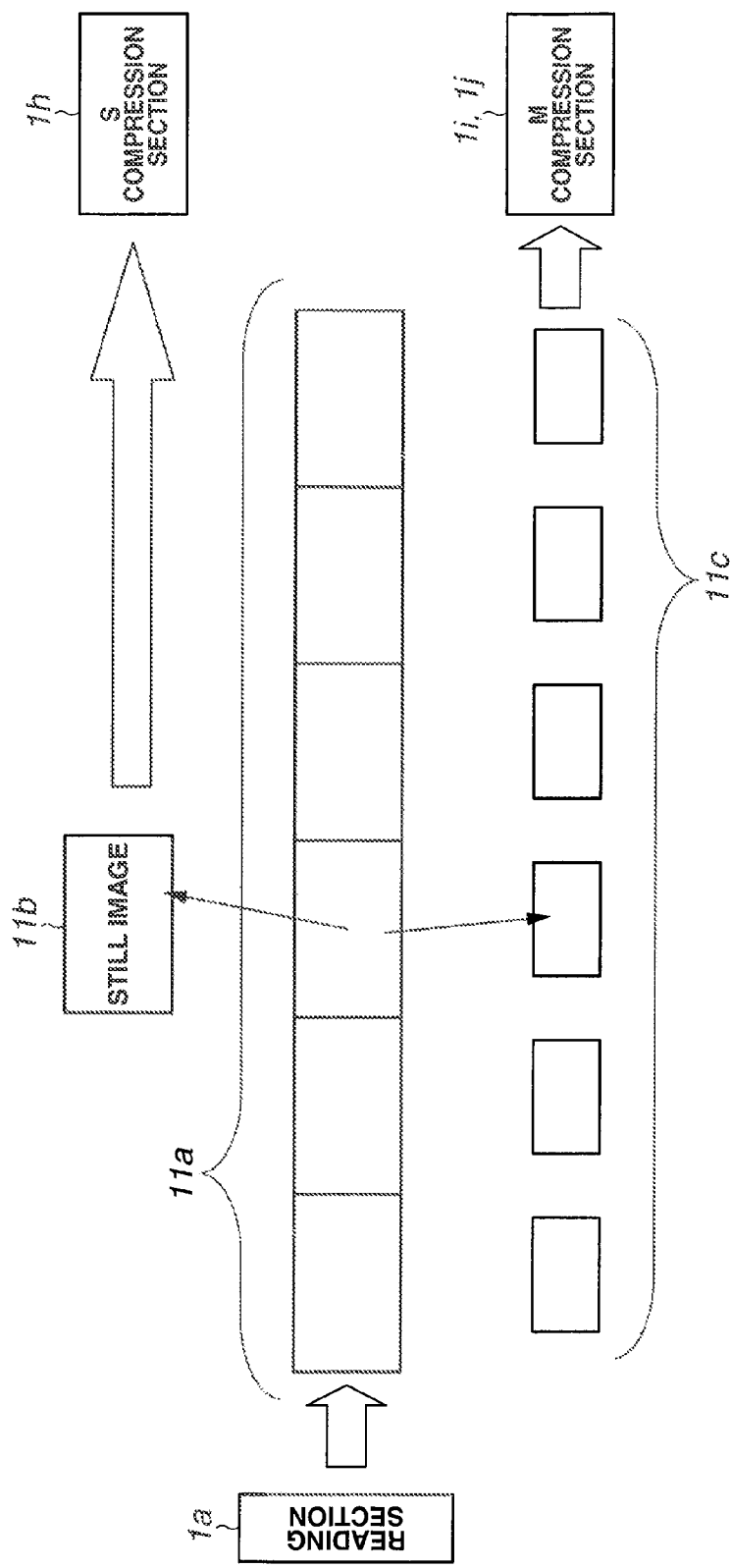
FIG. 2 is an explanatory diagram showing an operation of a photo in movie mode.
Figure 3:
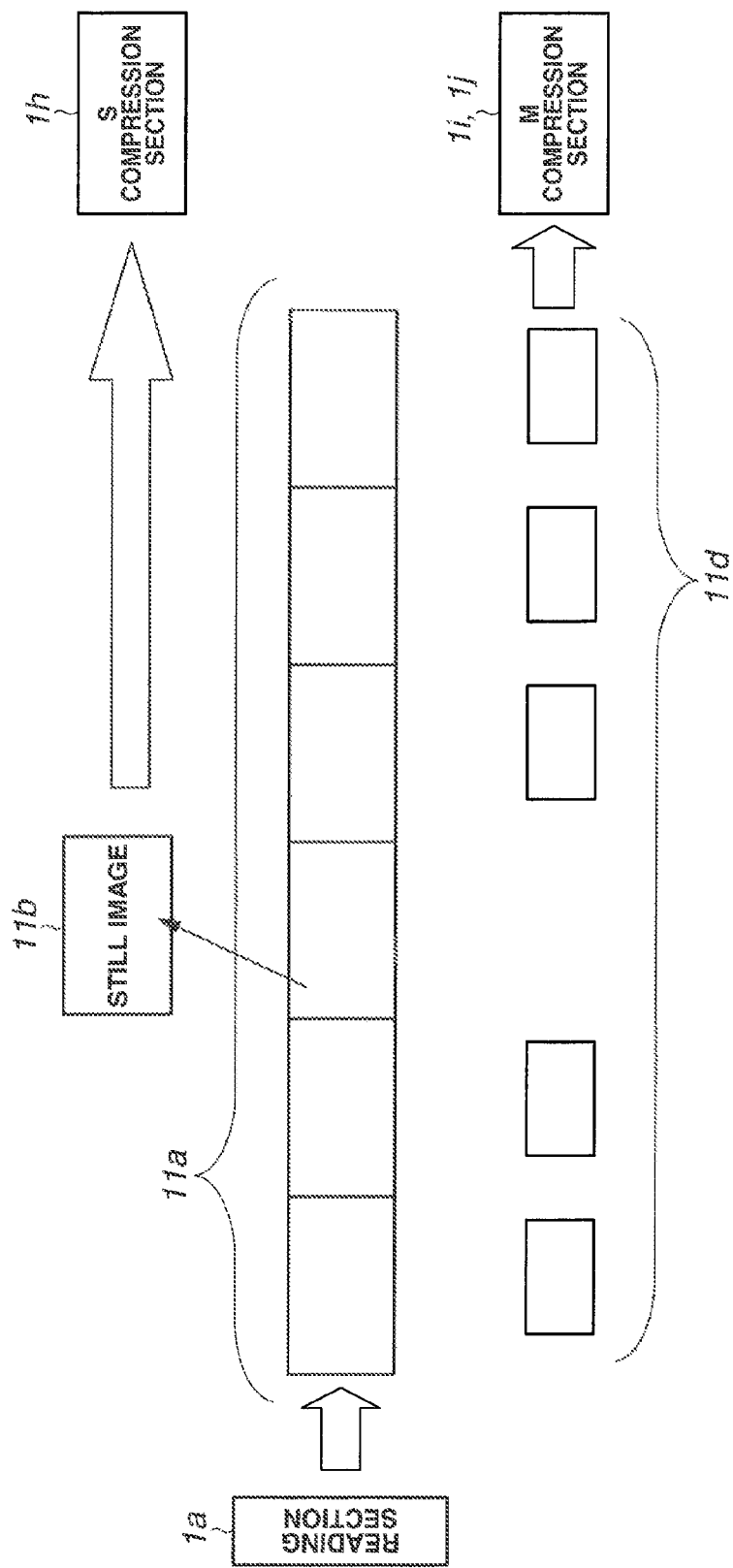
FIG. 3 is an explanatory diagram showing an operation of a reminiscence photo mode.

First, description will be made on a photo in movie mode, a reminiscence photo mode and a multi-frame mode, which are shooting modes provided for the shooting apparatus of the present embodiment with reference to FIG. 2 to FIGS. 5A and 5B. FIGS. 2 to 4 are explanatory diagrams showing operations of the photo in movie mode, the reminiscence photo mode and the multi-frame mode, respectively. FIGS. 5A and 5B are explanatory diagrams showing an example of an input image and a partial image. In FIGS. 2 to 4, respective frames of a video output 11a of the reading section 1a, which reads images from the image pickup section 2, are indicated by successive rectangular frames.

In the photo in movie mode shown in FIG. 2, it is shown that a video 11c obtained by resizing each of frames of the video output 11a is provided for the M compression sections 1i and 1j. The M compression sections 1i and 1j perform compression processing of the inputted video 11c to obtain a compressed video image. This compressed video image is recorded as a video in the photo in movie mode.

In the photo in movie mode, when the still image shooting operation section 6b is operated by the user during video shooting, a still image 11b of a frame corresponding to the still image shooting operation among the frames of the video output 11a is given to the S compression section 1h. The S compression section 1h performs compression processing of the inputted still image 11b to obtain a compressed still image. This compressed still image is recorded as a still image in the photo in movie mode.

In the reminiscence photo mode shown in FIG. 3, each frame of the video output 11a is temporarily recorded. In the reminiscence photo mode, when the still image shooting operation section 6b is operated by the user during video shooting, the still image 11b of a frame corresponding to the still image shooting operation among the frames of the video output 11a is given to the S compression section 1h. The S compression section 1h performs compression processing of the inputted still image 11b to obtain a compressed still image. This compressed still image is recorded as a still image in the reminiscence photo mode.

On the other hand, frames before and after the still image 11h are resized and then provided for the M compression sections 1i and 1j as a reminiscence video 11d related to the still image 11b. The M compression sections 1i and 1j perform compression processing of the inputted reminiscence video 11d to obtain a compressed video image. This compressed video image is recorded as a reminiscence video in the reminiscence photo mode.

In the multi-frame mode shown in FIG. 4, it is shown that a whole video 11e obtained by resizing each of the frames of the video output 11a is provided for the M compression sections 1i and 1j. The M compression sections 1i and 1j perform compression processing of the inputted whole video 11e to obtain a compressed video image. This compressed video image is recorded as a whole video in the multi-frame mode.

FIG. 5A shows an inputted image. In the example of FIG. 5A, three persons A to C are shown in the inputted image. It is assumed that, in the multi-frame mode, the user performs a part specification operation of specifying a specified partial area which includes the face of the person A as shown by a broken-line area in FIG. 5A. Then, an image (partial image) of the specified partial area shown in FIG. 5B is extracted from the inputted image. Furthermore, the partial image in the inputted image is pursued by the characteristic judging section 1d and the pursuit section 1e, and the partial image of the person A is extracted from each frame after that. Then, a partial video 11f constituted by the partial images of the respective frames of the video output 11a is provided for the M compression sections 1i and 1j. The M compression sections 1i and 1j perform compression processing of the inputted partial video 11f to obtain a compressed video image. This compressed video image is recorded as a partial video in the multi-frame mode.

Next, camera shooting control will be described with reference to a flowchart in FIG. 6.

When the shooting apparatus 10 is powered on by operating the operation section 6, the signal processing/control section 1 starts display and temporary recording of a through image at step S1, That is, the signal processing/control section 1 drives the image pickup section 2 to shoot a subject. The reading section 1a reads out picked-up images from the image pickup section 2 and causes the temporary-recording-for-distribution section 3 to sequentially record the picked-up images. The temporary-recording-for-distribution section 3 sequentially records the images picked up for a predetermined time period.

The signal processing/control section 1 sequentially reads out the picked-up images recorded in the temporary-recording-for-distribution section 3 and gives the images to the image processing section 1b or 1c. The image processing section 1b or 1c performs predetermined image signal processing on the picked-up images and then gives the images to the display control section 1g via the image selecting section 1f. The display control section 1g gives the inputted images to the display section 5 to cause the images to be displayed. In this way, a through image is displayed on the display screen of the display section 5.

Next, the signal processing/control section 1 judges whether the still image shooting operation section 6b has been operated or not, at step S2. Furthermore, the signal processing/control section 1 judges whether the video shooting operation section 6a has been operated or not, at step S5.

In the present embodiment, the signal processing/control section 1 is adapted to set the reminiscence photo mode if it is judged at step S2 that the still image shooting operation section 6b has been operated, and set the photo in movie mode if it is judged at step S5 that the video shooting operation section 6a has been operated.

If it is judged at step S2 that the still image shooting operation section 6b has been operated, the signal processing/control section 1 performs still image shooting in the reminiscence photo mode at step S3 and performs reminiscence video recording in the reminiscence photo mode at step S4. That is, at a timing of operating the still image shooting operation section 6b, the signal processing/control section 1 reads out a picked-up image (still image) acquired from the reading section 1a, from the temporary-recording-for-distribution section 3 and gives the picked-up image to the image processing section 1b or 1c. The image processing section 1b or 1c performs image processing of the inputted still image and provides it for the S compression section 1h via the image selecting section 1f. The S compression section 1h compresses the inputted still image, and the recording control section 1k gives the compressed still image to the recording section 4 to record it (step S3).

The signal processing/control section 1 reads out video images before or after the still image read out from the temporary-recording-for-distribution section 3 and gives the video images to the image processing section 1b or 1c. The image processing section 1b or 1c resizes the inputted video images to provide a reminiscence video to the M compression section 1i or 1j via the image selecting section 1f. The M compression section 1i or 1j compresses the inputted reminiscence video, and the recording control section 1k gives the compressed reminiscence video to the recording section 4 to record the video (step S4).

If it is judged at step S5 that the video shooting operation section 6a has been operated, the signal processing/control section 1 performs video shooting in the photo in movie mode at step S6. The signal processing/control section 1 reads out video images sequentially recorded to the temporary-recording-for-distribution section 3 and gives the video images to the image processing section 1b or 1c. The image processing section 1b or 1c resizes the inputted video images and provides the images to the M compression section 1i or 1j via the image selecting section 1f. The M compression section 1i or 1j compresses the inputted video in the photo in movie mode, and the recording control section 1k gives the compressed video images to the recording section 4 to record the video images (step S6).

When the still image shooting operation section 6b is operated in this photo in movie mode, the signal processing/control section 1 moves the process from step S7 to step S8 via step S16 and performs still image shooting. That is, at a timing of operating the still image shooting operation section 6b, the signal processing/control section 1 reads out a picked-up image (still image) acquired from the reading section 1a, from the temporary-recording-for-distribution section 3 and gives the picked-up image to the image processing section 1b or 1c. The image processing section 1b or 1c performs image processing of the inputted still image and provides it for the S compression section 1h via the image selecting section 1f. The S compression section 1h compresses the inputted still image, and the recording control section 1k gives the compressed still image to the recording section 4 to record it (step S8). In this way, still image recording in the photo in movie mode is performed.

If the operation of the still image shooting operation section 6b at step S7 is not detected in the photo in movie mode, the signal processing/control section 1 judges at step S9 whether an end operation has been performed or not. If the end operation has not been performed, the signal processing/control section 1 moves the process to step S10 to judge whether a part specification operation has been performed or not.

In the present embodiment, if a part specification operation occurs in the photo in movie mode, the mode transitions to the multi-frame mode. If the operation does not occur, the photo in movie mode continues. That is, if not detecting occurrence of a part specification operation at step S10 at the time of the photo in movie mode, the signal processing/control section 1 judges at step S11 that transition to the multi-frame mode has not occurred, returns the process to step S6 to continue the photo in movie mode. If detecting occurrence of a part specification operation, the signal processing/control section 1 moves the process to step S12 and sets the multi-frame mode.

In the multi-frame mode also, a whole image obtained by resizing an inputted image is recorded as a video, similarly to the time of the photo in movie mode. Therefore, even after transition to the multi-frame mode, the signal processing/control section 1 reads a video image from the temporary-recording-for-distribution section 3, causes the image processing section 1b to resize the video image to obtain a whole image, and gives the whole image to the M compression section 1i or 1j via the image selecting section 1f to compress the whole image. The recording control section 1k causes the recording section 4 to record the compressed whole image.

At the time of the multi-frame mode, the signal processing/control section 1 gives an image read from the temporary-recording-for-distribution section 3 to the image processing section 1c to cut a partial image corresponding to a part specification operation. In this case, the image processing section 1c cuts a specified partial area which includes a part image pursued by the pursuit section 1e. In this way, a video image configured by the partial image is outputted from the image processing section 1c, provided for the M compression section 1i or 1j via the image selecting section 1f to be compressed, and then the recording control section 1k causes the recording section 4 to record the compressed video image (step S13).

Figure 7A:
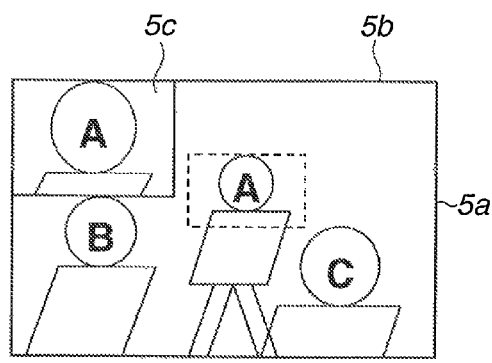
FIGS. 7A and 7B are explanatory diagrams for illustrating screen displays in the multi-frame mode.
Figure 7B:
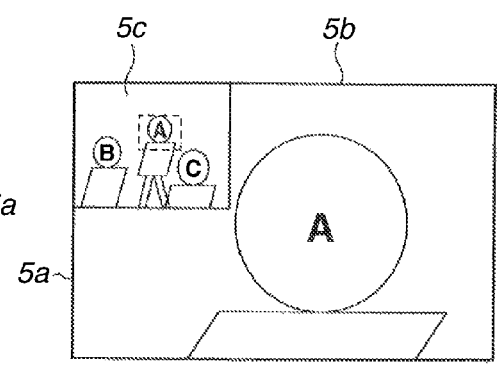

Furthermore, in the present embodiment, a whole image and a partial image are picture-in-picture displayed at the time of the multi-frame mode to improve convenience. FIGS. 7A and 7B are explanatory diagrams for illustrating screen displays in the multi-frame mode, and an example in the case where the same inputted image as FIGS. 5A and 5B has been inputted is shown.

Now, it is assumed that the inputted image shown in FIG. 5A is inputted to the image processing sections 1b and 1c. In the example of FIG. 5A, three persons A to C are shown in the inputted image. It is assumed that the user performs a part specification operation of specifying a specified partial area which includes the face of the person A as shown by the broken-line area in FIG. 5A. Then, an image (partial image) of the specified partial area indicated by the broken-line part in FIG. 5A is extracted from the inputted image. Furthermore, the partial image in the inputted image is pursued by the characteristic judging section 1d and the pursuit section 1e, and an area which includes the partial image of the person A is specified as a specified partial area to the image processing section 1c.

The image processing section 1c pursues and cuts the partial image in accordance with an instruction of the pursuit section 1e. The image processing section 1c directly outputs the partial image shown in FIG. 5B to the M compression section 1i or 1j via the image selecting section 1f, and, after combining the partial image with a whole image, outputs the composite image to the display control section 1g via the image selecting section 1f.

That is, as shown in FIG. 7A, the image processing section 1c combines the whole image with the partial image so that a main image based on the whole image is arranged in a main display area 5b, which is almost the whole area of a display screen 5a of the display section 5, and the partial image is arranged in a partial area (hereinafter referred to as a sub-display area) 5c of the display screen 5a as a sub-image. That is, in this case, the image processing section 1c causes the partial image to be a sub-image (step S12).

At the time of the multi-frame mode, the signal processing/control section 1 judges at step S14 whether the user has touched the sub-display area 5c or not. If the user has touched the sub-display area 5c, the signal processing/control section 1 causes the current sub-image to be a main image and causes the current main image to be a sub-image at step S15.

FIG. 7B shows this state. When the sub-display area 5c is touched in the state of FIG. 7A, the partial image, which is a sub-image displayed in the sub-display area 5c, is displayed in the main display area 5b as a main image, and the whole image, which is a main image displayed in the main display area 5b, is displayed in the sub-display area 5c as a sub-image. When the sub-display area 5c is touched in the state of FIG. 7B, the whole image, which is a sub-image displayed in the sub-display area 5c, is displayed in the main display area 5b as a main image, and the partial image, which is a main image displayed in the main display area 5b, is displayed in the sub-display area 5c as a sub-image. That is, the state returns to the display in FIG. 7A.

When detecting that the user has operated the still image shooting operation section 6b, at step S7 at the time of the multi-frame mode, the signal processing/control section 1 transitions to the photo in movie mode. Since this is a case of transition from the multi-frame mode to the photo in movie mode, the process transitions from step S16 to S17, and still image shooting is performed.

In the present embodiment, immediately before the still image shooting at step S17, the whole image and the partial image are combined and displayed on the display screen 5a of the display section 5 as shown in FIGS. 7A and 7B. Therefore, in still image shooting in the photo in movie mode at step S17, still images of all of the whole image, the partial image, and the composite images of the whole image and the partial image are recorded. That is, the whole images from the image processing section 1b and 1c are provided for the S compression section 1h via the image selecting section 1f to be compressed, and then the recording control section 1k causes the recording section 4 to record the compressed whole image. The image processing section 1c cuts a partial image, and the partial image is provided for the S compression section 1h via the image selecting section 1f to be compressed, and then the recording control section 1k causes the recording section 4 to record the compressed partial image. The image processing section 1c generates the composite images of the whole image and the partial image. That is, two composite images, a composite image in which the partial image is caused to be a sub-image and a composite image in which the whole image is caused to be a sub-image, are provided for the S compression section 1h via the image selecting section 1f to be compressed, and then the recording control section 1k causes the recording section 4 to record the compressed composite images. In this way, when the multi-frame mode transitions to the photo in movie mode by operating of the still image shooting operation section 6b, four still images of the whole image, the partial image, and the two composite images configured by the whole image and the partial image are recorded.

As described above, in the present embodiment, by providing image processing sections of multiple systems and image compressing sections of multiple systems for temporarily recording a picked-up image and performing image processing of the inputted image which has been temporarily recorded and detecting an operation of a video shooting operation section and an operation of a still image shooting operation section, switching among the reminiscence photo mode, the photo in movie mode and the multi-frame mode is performed. Thereby, it is possible to shorten time required for transition to these shooting modes and shooting, and it becomes possible to perform certain shooting at the right moment to take a picture.

In the multi-frame mode, it is possible to display a composite image of a whole image and a partial image, which is advantageous in convenience. Furthermore, it is also advantageous that, when the multi-frame mode transitions to the photo in movie mode, still images of a whole image, a partial image, and composite images of the whole image and the partial image can be obtained by operating the still image shooting operation section.

(Second Embodiment)

Figure 8:
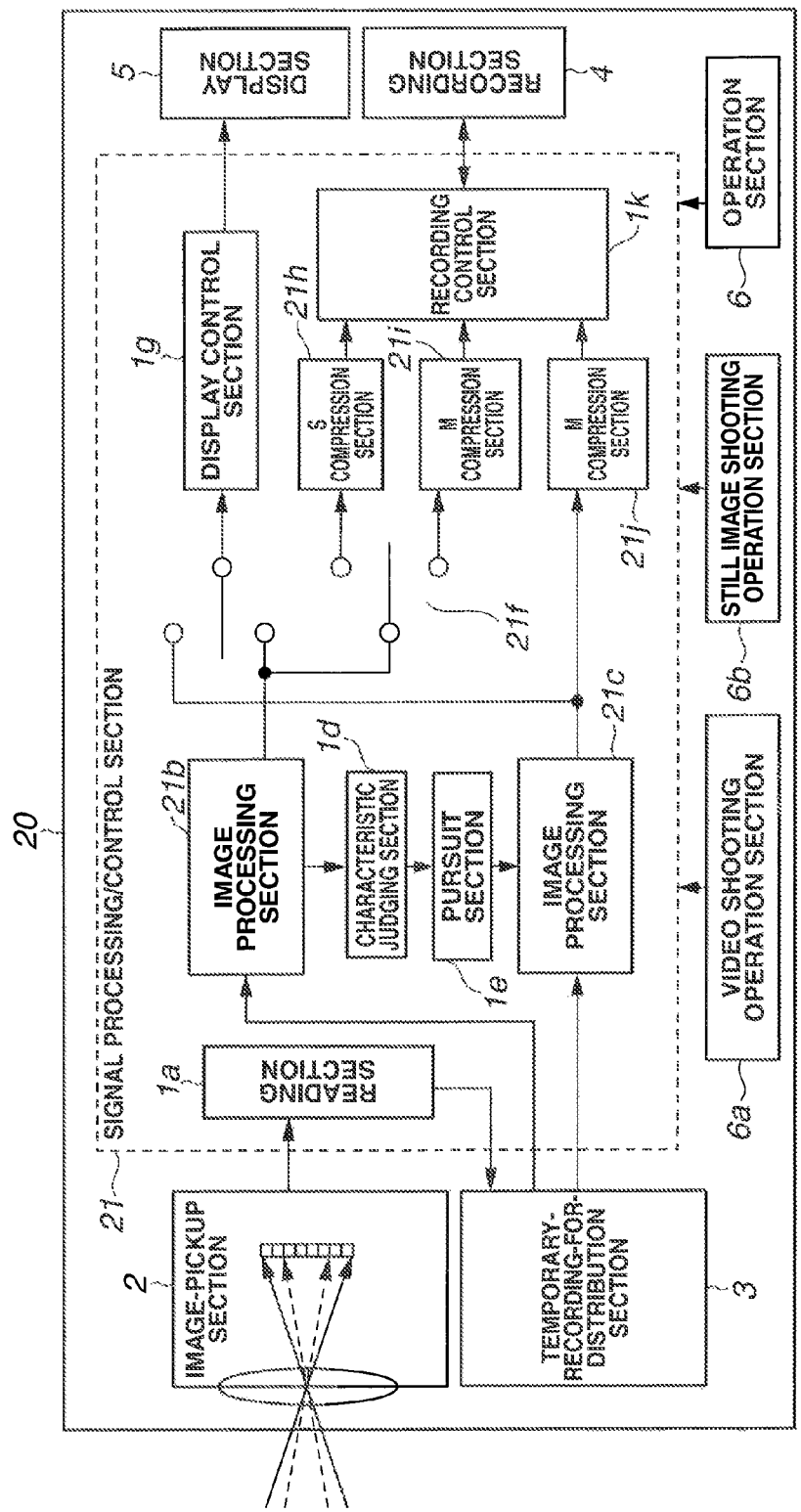
FIG. 8 is a block diagram showing a second embodiment of the present invention.

FIG. 8 is a block diagram showing a second embodiment of the present invention. In FIG. 8, the same components as in FIG. 1 are given the same reference numerals, and description thereof will be omitted.

In the first embodiment, description has been made on the example in which, when the multi-frame mode transitions to the photo in movie mode, four still images of a whole image, a partial image, and two composite images configured by the whole image and the partial image are recorded. However, since a video image obtained by resizing an inputted image is also recorded at the time of the photo in movie mode, it is not necessarily possible to record all the four still images, depending on the recording capacity of the temporary-recording-for-distribution section, and the number of systems or processing capacity of the image processing sections and the image compressing sections. It is possible to record all the four still images if the still images to be recorded are retained in the temporary-recording-for-distribution section for a long time at the time of the photo in movie mode, and the still images to be recorded are read from the temporary-recording-for-distribution section after video recording ends. However, since the still images cannot be recorded immediately after operating the still image shooting operation section, it cannot be necessarily said that the first embodiment is excellent in convenience.

A shooting apparatus 20 in FIG. 8 is different from the first embodiment in that a signal processing/control section 21 is adopted instead of the signal processing/control section 1. An image processing section 21b, an image processing section 21c, an image selecting section 21f, an S compression section 21h and M compression sections 21i and 21j of the signal processing/control section 21 have functions similar to those of the image processing section 1b, the image processing section 1c, the image selecting section 1f, the S compression section 1h and the M compression sections 1i and 1j, respectively. However, they have only a capacity of processing a video image in almost real time. Therefore, each of the image processing sections 21b and 21c cannot perform processing of two video images at the same time nor perform processing of a video image and a still image at the same time. Similarly, each of the S compression section 21h and the M compression sections 21i and 21j cannot perform processing of two video images at the same time nor perform processing of a video image and a still image at the same time.

Therefore, in the case of using processing circuits of two systems as in the present embodiment, it is conceivable that it is possible to perform recording processing of only two video images at the same time, and that it is possible to perform recording processing of only one video image and one still image at the same time.

Figure 6:
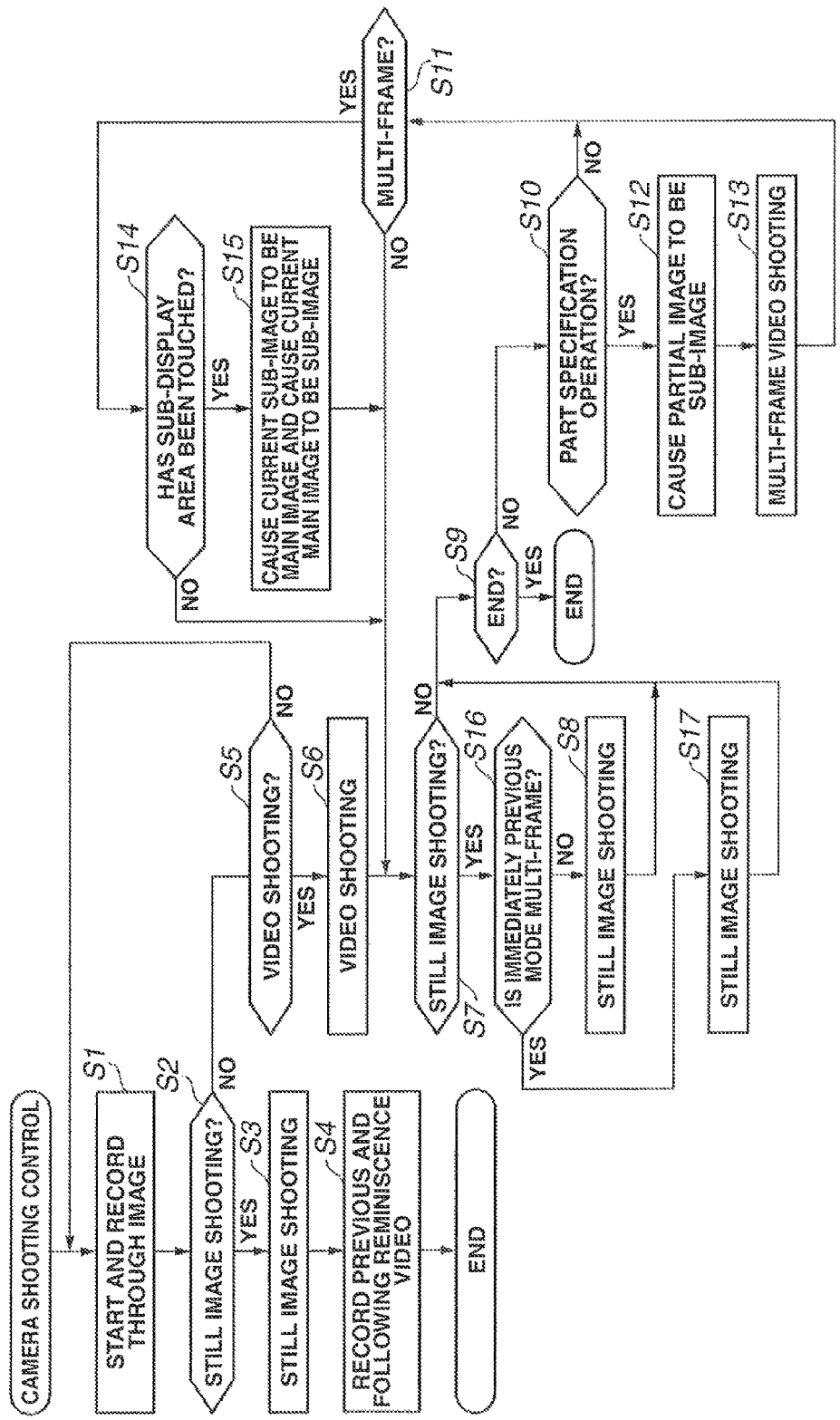
FIG. 6 is a flowchart showing camera shooting control.

In the present embodiment also, the signal processing/control section 21 is capable of switching among the reminiscence photo mode, the photo in movie mode and the multi-frame mode in accordance with the flowchart in FIG. 6. However, even when the multi-frame mode transitions to the photo in movie mode by operating the still image shooting operation section 6b, it is only possible to record one video image and one still image.

Therefore, in the present embodiment, the signal processing/control section 21 is adapted to select and record one video image and one still image according to a state of a partial image in a specified partial area being pursued. That is, the signal processing/control section 21 judges whether pursuit is successful or not. For example, if most of a partial image is included in a specified partial area being pursued, the signal processing/control section 21 judges that the pursuit is successful. In this case, the signal processing/control section 21, for example, records a still image obtained from the partial image. If the state that most of the partial image is included in the specified partial area being pursued is not obtained, the signal processing/control section 21 judges that the pursuit is not successful and, for example, records a whole image as a still image.

Next, operations of the embodiment configured as described above will be described with reference to FIGS. 9A and 9B to FIGS. 16A and 16B. FIGS. 9A and 9B to FIGS. 11A and 11C, and FIGS. 16A and 16B are explanatory diagrams for illustrating the operations of the present embodiment, and FIGS. 12 to 15 are flowcharts for illustrating the operations of the present embodiment.

In the present embodiment, only operations performed when the multi-frame mode transitions to the photo in movie mode are different from those of the first embodiment. When the multi-frame mode transitions to the photo in movie mode, two video images, or one video image and one still image are outputted from the image processing sections 21h and 21c. The image processing section 21c gives a video image to the M compression section 21j. The image processing section 21b outputs a video image or a still image. If the image processing section 21b outputs a video image, the image selecting section 21f gives the video image to the M compression section 21i. If the image processing section 21b outputs a still image, the image selecting section 21f gives the still image to the S compression section 21h.

FIGS. 9A and 9B show examples of a video image and a still image which can be recorded when the multi-frame mode transitions to the photo in movie mode. FIG. 9A shows a state of, when the multi-frame mode transitions to the photo in movie mode by operating the still image shooting operation section 6b in a state that a video image 31a based on a whole image obtained by resizing an inputted image and a video image of a partial image 31b of a specified partial area are recorded in the multi-frame mode, recording a still image 31c obtained from the partial image 31b. In this case, recording of the video image of the partial image 31b is temporarily stopped, and the still image 31c based on the partial image 31b is obtained.

On the other hand, FIG. 9B shows a state of, when the multi-frame mode transitions to the photo in movie mode by operating the still image shooting operation section 6b in a state that a video image 32b based on a whole image obtained by resizing an inputted image and a video image of a partial image 32a of a specified partial area are recorded in the multi-frame mode, recording a still image 32c obtained from the whole image. In this case, recording of the video image based on the whole image obtained by resizing the inputted image is temporarily stopped, and the still image 32c based on the whole image is obtained.

The processes in FIGS. 9A and 9B are such that, when the still image shooting operation section 6b is operated in the multi-frame mode, recording of one of two video images recorded in the multi-frame mode is temporarily stopped while recording of the other video image is continued to obtain a still image at the time point of operating the still image shooting operation section 6b. From this point of view, the process can be said to be still image recording in the multi-frame mode rather than transition to the photo in movie mode. However, the examples in FIGS. 9A and 9B are treated as transition from the multi-frame mode to the photo in movie mode for convenience of description.

It is also possible to continue only one of two video recordings at the time of the multi-frame mode, stop the other video recording, and perform still image recording of a source image of the one video recording. That is, in this case, it is possible to perform video recording of a resized whole image as well as performing still image recording of the whole image. It is also possible to perform video recording of a partial image of a specified partial area of an inputted image as well as recording the partial image as a still image.

Figure 10A:
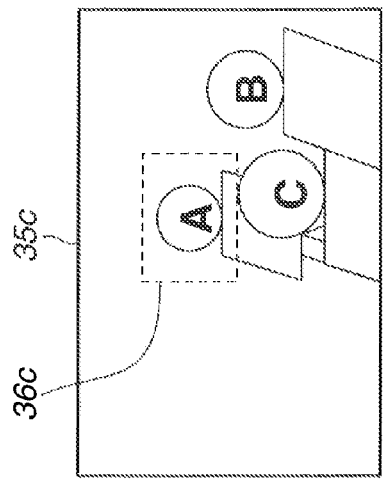
FIGS. 10A to 10C are explanatory diagrams for illustrating an operation of the second embodiment.
Figure 10B:
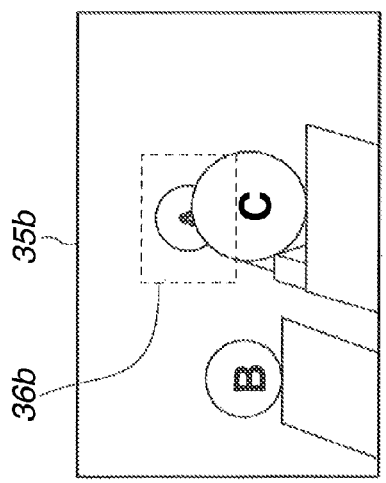
Figure 10C:
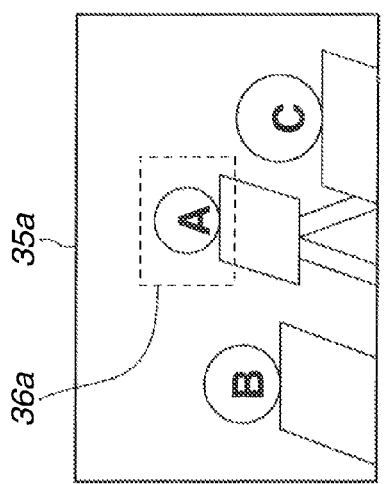

FIGS. 10A to 10C show an example of a series of inputted images which are being shot when the multi-frame mode transitions to the photo in movie mode and show that a subject changes from a state of FIG. 10A to a state of FIG. 10B, and then to a state of FIG. 10C. FIGS. 10A to 10C show that three persons A to C have been shot as a subject, and that an area which includes the face of the person A among the persons is specified as a specified partial area. FIGS. 11A to 11C show partial images. FIGS. 11A to 11C show partial images in the specified partial area shown by broken lines in the inputted images in FIGS. 10A to 10C, respectively.

In the multi-frame mode, a video image based on a whole image obtained by resizing an inputted image and a video image of a partial image of a specified partial area in the inputted image are recorded. Now, it is assumed that a specified partial area 36a indicated by broken lines is set in an inputted image 35a shown in FIG. 10A. A pursuit section 1e performs pursuit even if the inputted image 35a changes into inputted images 35b and 35c and detects specified partial areas 36b and 36c. In the multi-frame mode, video images based on whole images obtained by resizing the inputted images 35a to 35c and partial images 37a to 37c (FIGS. 11A to 11C) corresponding to the specified partial areas 36a to 36c are recorded.

It is assumed that, for such inputted images, the multi-frame mode transitions to the photo in movie mode by the user operating the still image shooting operation section 6b at a timing of the inputted image 35b. In this case, if, for example, the recording method in FIG. 9A is adopted, a partial image 37b is recorded as a still image. If the recording method in FIG. 9B is adopted, a whole image based on the inputted image 35b is recorded as a still image.

Since the whole movement can be seen in the video images of the partial images 35a to 35c in FIGS. 10A to 10C, it is thought that it is better not to suspend shooting. As for the still image of the partial image 37a in FIG. 11A, since the partial image of the specified partial area specified by the user occupies most of the screen, the subject matter is clear, and the still image is impressive. Therefore, in the example in FIGS. 10A to 10C and FIGS. 11A to 11C, it is better to continue video recording based on the whole images obtained resizing the inputted images, while stopping video recording of the partial images, and perform still image recording of the partial images.

However, though the area which includes the face of the person A is specified as a specified partial area in FIG. 10A, most of the partial image of the person A is not seen, being hidden by the person C, in the partial image 37b in FIG. 11B. Therefore, the partial image 37b is thought to be a still image that does not satisfy the user. In the present embodiment, a video image and still image to be recorded are controlled in accordance with a result of pursuing a partial image.

Figure 12:
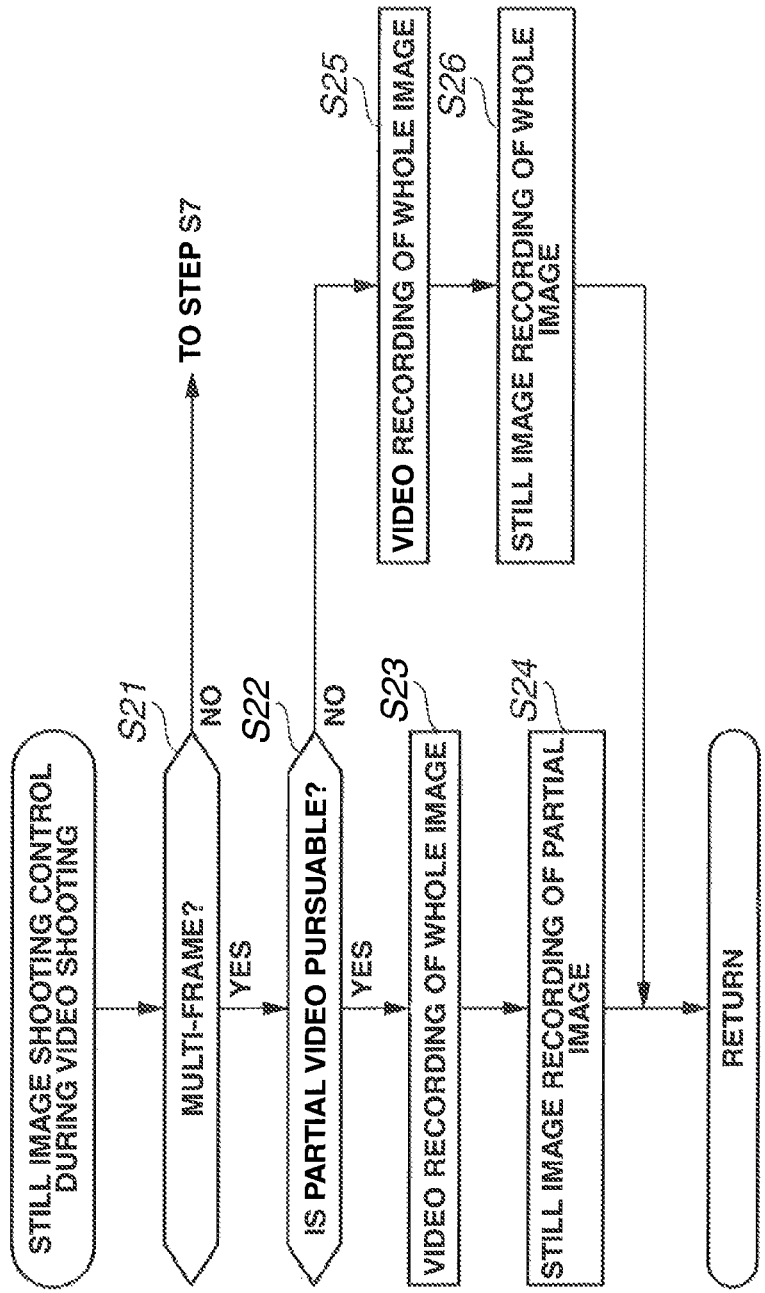
FIG. 12 is a flowchart for illustrating an operation of the second embodiment.

FIG. 12 shows the control by the signal processing/control section 21. FIG. 12 shows a process in the case of performing still image shooting during video shooting, especially at the time of the multi-frame mode, and shows a process performed at step S17 in FIG. 6. When the multi-frame mode transitions to the photo in movie mode by operating the still image shooting operation section 6b, the signal processing/control section 21 performs recording in accordance with the flow in FIG. 12. That is, at step S21, it is judged whether or not the multi-frame mode has transitioned to the photo in movie mode by operating the still image shooting operation section 6b. If the multi-frame mode has not transitioned, the process is moved to steps S7 and S8, still image shooting in the photo in movie mode is performed.

If the multi-frame mode has transitioned, the signal processing/control section 21 judges whether or not it is possible to pursue a partial video image, at step S22. In the present embodiment, in the case where most of a partial image is lost in a specified partial area, or the like, it is judged that pursuit is impossible even if pursuit processing by the pursuit section 1e is completely being performed.

If pursuit is possible, the signal processing/control section 21 performs video recording of a whole image obtained by resizing an inputted image, at step S23, and performs still image recording of the partial image at step S24. That is, the recording method in FIG. 9A is adopted.

If pursuit is impossible, the signal processing/control section 21 performs video recording of the whole image obtained by resizing the inputted image, at step S25, and performs still image recording of the whole image at step S26. That is, in this case, video recording processing of the whole image obtained by resizing the inputted image is continued, video image recording of the partial image is stopped, and the whole image is recorded as a still image.

That is, since a video image from which the whole movement is seen is more enjoyable because a situation is known better therefrom, the signal processing/control section 21 continues the process for video recording of the whole image obtained by resizing the inputted image when the still image shooting operation section 6b is operated in the multi-frame mode. On the other hand, the signal processing/control section 21 gives up causing the partial image to be a video image in a narrow angle of view, and the signal processing/control section 21 performs still image recording of the partial image if pursuit is possible and performs still image recording of the whole image if pursuit is impossible.

Figure 13:
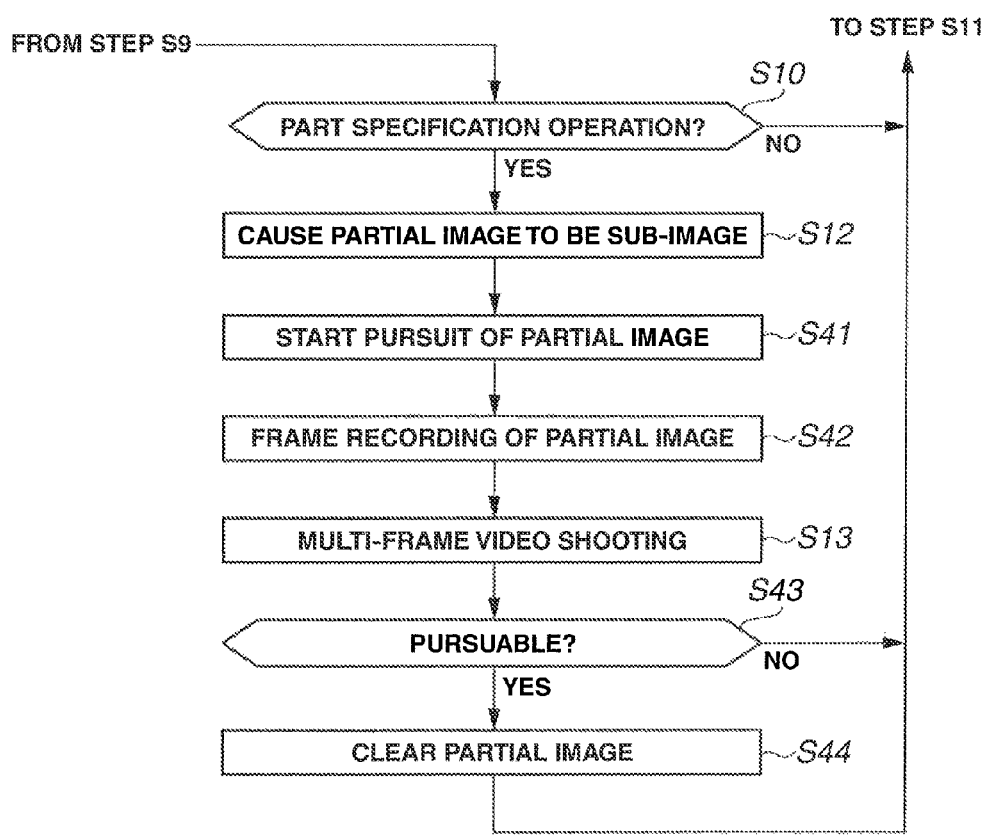
FIG. 13 is a flowchart for illustrating an operation of the second embodiment.
Figure 14:
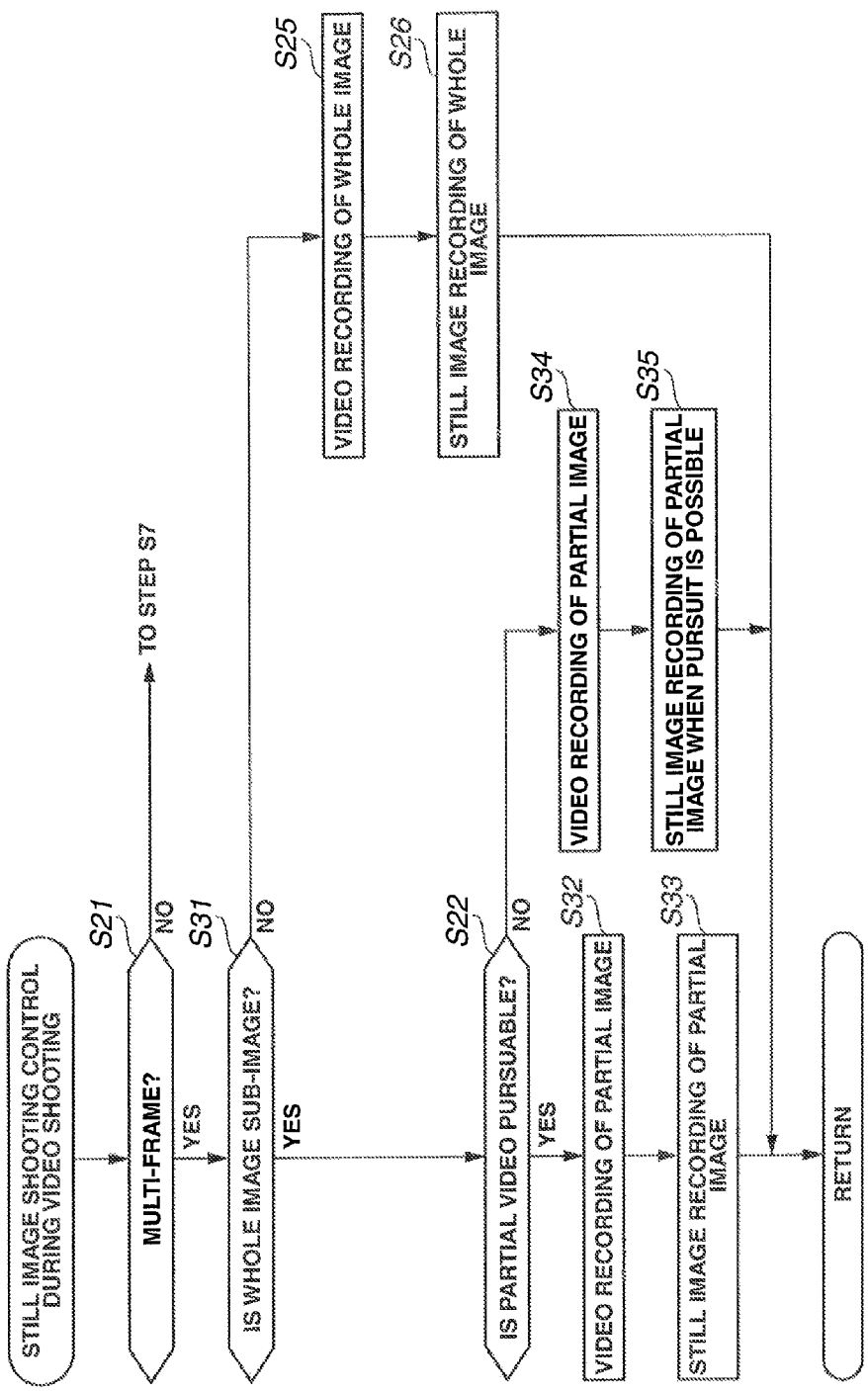
FIG. 14 is a flowchart for illustrating an operation of the second embodiment.

FIGS. 13 and 14 show other controls by the signal processing/control section 21. The control in FIG. 12 is such that, if it is judged that pursuit of a partial image is impossible, a whole image is recorded as a still image. However, in the case where it is possible to display a main image and a sub-image on the display screen 5a at the same time and specify any of a whole image and a partial image as the main image by a user's selection operation, as in FIGS. 7A and 7B, it is thought the user desires to record the main screen as a still image. Examples in FIGS. 13 and 14 correspond to this case. In FIGS. 13 and 14, the same steps as in FIGS. 6 and 12, respectively, are given the same reference numerals, and description thereof will be omitted.

In a shooting apparatus which is not provided with a function of combining and displaying a main image and a sub-image in the multi-frame mode as shown in FIGS. 7A and 7B, control adopting the flowchart in FIG. 12 is performed.

At step S41 in FIG. 13, the pursuit section 1e of the signal processing/control section 21 starts pursuit of a partial image. The signal processing/control section 21 performs frame recording of a partial image to the temporary-recording-for-distribution section 3. At step S43, the signal processing/control section 21 judges whether pursuit of the partial image is possible or not. If pursuit is possible, the signal processing/control section 21 clears the partial image frame-recorded, at step S44.

Therefore, when pursuit of the partial image becomes impossible, a frame image of the partial image in a pursuable state before pursuit becomes impossible is recorded in the temporary-recording-for-distribution section 3.

FIG. 14 shows a process in the case of performing still image shooting during video shooting, especially at the time of the multi-frame mode and shows a process performed at step S17 in FIG. 6. In FIG. 14, the signal processing/control section 21 judges at step S31 whether a whole image is a sub-image or not. That is, if the display in FIG. 7B is shown by a user operation in the multi-frame mode, there is a possibility that the user thinks that a still image of a partial image is recorded by operating the still image shooting operation section 6b. Therefore, when the whole image is a sub-image, the signal processing/control section 21 performs video recording of the partial image at step S32 and performs still image recording of the partial image at step S33, if pursuit of the partial image is possible. If pursuit of the partial image is impossible, the signal processing/control section 21 performs video recording of the partial image at step S34 and performs still image recording of the partial image at a pursuable timing at step S35. For example, in the example in FIGS. 10A to 10C and FIGS. 11A to 11C, a partial image shown in FIG. 11A is recorded as a still image. Thereby, it is possible to record a video image and still image the user desires.

Figure 15:
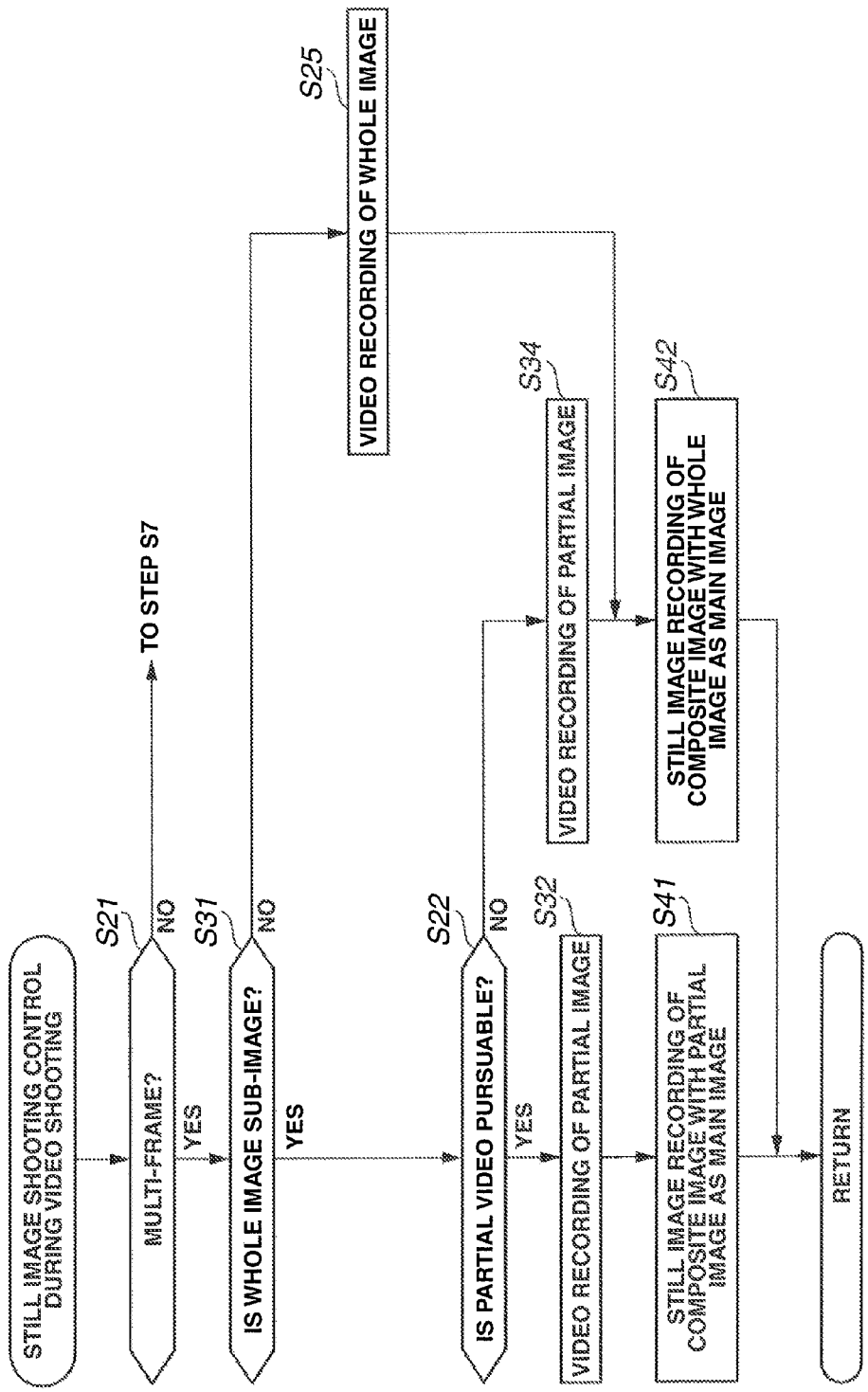
FIG. 15 is a flowchart for illustrating an operation of the second embodiment.
Figure 16A:
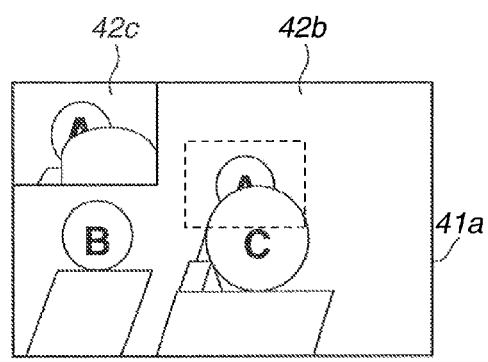
FIGS. 16A and 16B are explanatory diagrams for illustrating an operation of the second embodiment.
Figure 16B:
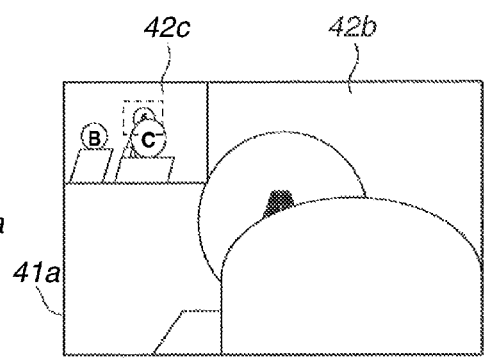

FIG. 15 and FIGS. 16A and 16B show other controls by the signal processing/control section 21. The controls in FIGS. 13 and 14 are such that video recording and still image recording of an image specified as a main image are performed. However, it is also conceivable that the user wants to perform still image recording of a composite image of a main image and a sub-image displayed on the display screen 5a as in FIGS. 7A and 7B. Examples in FIG. 15 and FIGS. 16A and 16B correspond to this case. In FIG. 15, the same steps as in FIG. 14 are given the same reference numerals, and description thereof will be omitted.

FIG. 15 shows a process in the case of performing still image shooting during video shooting, especially at the time of the multi-frame mode and shows a process performed at step S17 in FIG. 6. In the flow in FIG. 15 also, the signal processing/control section 21 judges at step S31 whether a whole image is a sub-image or not.

FIG. 16A shows an example in which a whole image and a partial image has been combined so that a main image based on a whole image is arranged in a main display area 42b, which is almost the whole area on a display screen 41a of the display section 5, and a partial image is arranged in a sub-display screen 42c on the display screen 41a as a sub-image. Broken lines in the display screen 41a indicate a specified partial area. On the other hand, FIG. 16B shows an example in which a main image based on the partial image is arranged in the main display area 42b, and a sub-image based on the whole image is arranged in the sub-display screen 42c.

If the whole image is a sub-image as in FIG. 16B, the signal processing/control section 21 judges at step S22 whether pursuit of the partial image is possible or not. If pursuit of the partial image is possible, the signal processing/control section 21 performs video recording of the partial image at step S32, and performs still image recording of a composite image with the partial image as a main image and the whole image as a sub-image at step S41.

FIG. 16B shows a state in which pursuit of the partial image is impossible. In this case, the signal processing/control section 21 performs video recording of the partial image at step 34, and performs still image recording of a composite image with the whole image as a main image and the partial image as a sub-image, that is, a composite image corresponding to FIG. 16A at step S42.

If the whole image is not a sub-image, the signal processing/control section 21 performs video recording of the whole image obtained by resizing the inputted image at step S25, and performs still image recording of a composite image with the whole image as a main image and the partial image as a sub-image at step S42.

As described above, in the present embodiment, if it is only possible to record two video images, or one video image and one still image at the same time, a video image and still image to be recorded are determined in accordance with a result of pursuing a partial image. For example, a video image based on a whole image obtained by resizing an inputted image is recorded as a video image so that the whole movement can be seen. As a still image, a partial image in a specified partial area is recorded if pursuit of the partial image is possible, and the whole image is recorded if the pursuit is impossible. Thereby, an advantage similar to that of the first embodiment can be obtained, and shooting satisfying what the user desires is possible even in the case of a small-scale circuit.

In each of the above embodiments, multiple still images can be recorded at the same time. For example, in the first embodiment, when the multi-frame mode transitions to the photo in movie mode, up to four still images of a whole image, a partial image, and two composite images configured by the whole image and the partial image can be recorded. In this case, a recording section 16 can record the still images in association with one another.

Figure 17:
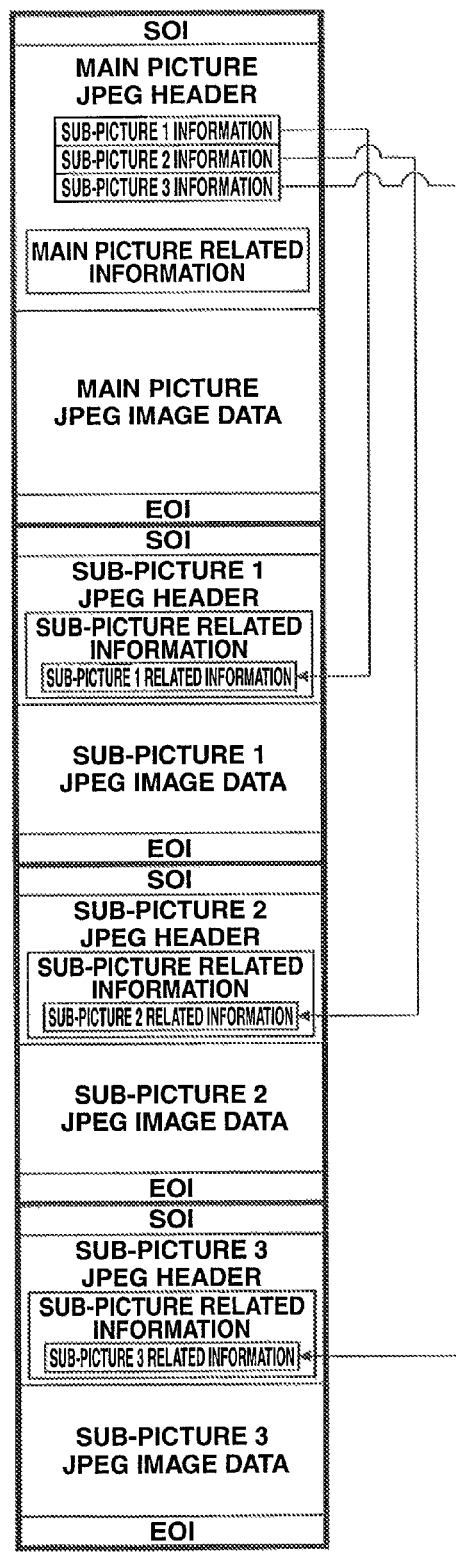
FIG. 17 is an explanatory diagram showing the outline of a configuration of a recording file of multiple still images recorded in association with one another by a recording section 16.

FIG. 17 is an explanatory diagram showing the outline of a configuration of a recording file of multiple still images recorded in association with one another by the recording section 16 (hereinafter referred to as a multi-image file). In FIG. 17, description will be made on the assumption that a whole image is a main picture, a partial image is a sub-picture 1, a composite image with the whole image as a main image and the partial image as a sub-image is a sub-picture 2, and a composite image with the whole image as a sub-image and the partial image as a main image is a sub-picture 3. In each of the above embodiments, any of the still images recorded at the same time may be a main picture, and any of the still images may be a sub-picture in any position in order.

As shown in FIG. 17, in a multi-image file, one JPEG image data, which is a main picture, is stored at the top, and three JPEG image data, which are sub-pictures, are successively stored. A JPEG header is added to each of the JPEG image data. A pair of a JPEG header and JPEG image data is configured between an image start marker SOI and an image end marker EOI.

In the multi-image file with such a configuration, information about each of the sub-pictures stored in the file is stored in the JPEG header of the main picture stored at the top of the file. As the information about the sub-pictures, the total number of the sub-pictures, an identification number of each sub-picture (for example, what position in order in the multi-image file the sub-picture is located), a pointer to each sub-picture, a type of each sub-picture (for example, in which of the shooting modes the sub-picture has been obtained) are given as some examples.

In the present embodiment, it is assumed that the multi-image file is divided into multiple JPEG files. Therefore, the divided JPEG files can be processed by a conventional apparatus, software or the like that is not compatible with a multi-image file.

In the multi-image file shown in FIG. 17, main picture related information is included in the main picture JPEG header, and sub-picture related information is included in the sub-picture JPEG headers. The related information is information required to, after dividing the multi-image file into multiple JPEG files, reconstruct the multi-image file, for example, by performing editing processing and the like and combining the JPEG files.

As examples of information recorded in the main picture JPEG header as the main picture related information, there are an identifier for identifying that the image is an image constituting a file in the multi-image file format, an image identification number "0" indicating that the relevant image data is main picture data (Because identification numbers of the sub-pictures are 1, ..., 4 here, the identification number "0" indicating the position of the main picture in order in the multi-image file is used as main picture identification information here. However, since any information that can identify that the image is the main picture is sufficient as the main picture identification information, other information, for example, "m", the first letter of "main picture" may be recorded. Any other information may also be recorded, and main picture file information for identifying a divided sub-picture or a divided main picture (for example, a unique ID, the file name of the main picture file itself, or the like) (this main picture file information is same group identification information for identifying that main picture data and one or more sub-picture data belong to a same multi-image file) may be recorded.

On the other hand, as for the sub-picture related information in a sub-picture k JPEG header of a sub-picture k (k=1, ..., 4), sub-picture k information recorded in the main picture JPEG header is referred to, and this sub-picture k information is basically copied and recorded. The reason why recording by copying is basically required is that, at the time of reconstructing the multi-image file from the group of divided images later, at least only the main picture JPEG header can be restored even if the JPEG file in which the main picture data is recorded does not exist. As for such information that copying is meaningless, it is not necessary to copy the information. For example, a pointer to a sub-picture is required in the multi-image file. However, since the pointer is recorded in another part in the JPEG header of a divided JPEG file, it is not necessary to copy the pointer. As examples of the sub-picture k information to be copied and recorded, the total number of sub-pictures, an identification number of each sub-picture (for example, what position in order in the multi-image file the sub-picture is located), a type of each sub-picture (for example, in which of the shooting modes the sub-picture has been obtained) are given.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A shooting apparatus comprising:
an image-pickup section outputting a picked-up image obtained by picking up an image of a subject;
a control section accepting a part specification operation of specifying a partial area of the picked-up image; and
a recording section being controlled by the control section to record still images based on a whole image based on the picked-up image, a partial image based on the partial area of the picked-up image, a composite image with the whole image as the main image and a composite image with the partial image as the main image when a still image shooting operation is performed after the part specification operation.

2. The shooting apparatus according to claim 1, comprising a display control section displaying the whole image based on the picked-up image as a main image and displaying the partial image based on the partial area of the picked-up image as a sub-image when the control section accepts the part specification operation.

3. The shooting apparatus according to claim 2, wherein the display control section is capable of exchanging the main image and the sub-image for each other to display the images; and
the recording section switches the main image and the sub-image to be recorded, to correspond to display by the display control section.

4. A mode setting method for controlling a shooting mode of a shooting apparatus comprising an image-pickup section, a control section controlling the image pick-up section and accepting a part specification operation of specifying a partial area of a picked-up image and a recording section, the method comprising the steps of:

the recording section being controlled by the control section to record still images based on a whole image based on the picked-up image, a partial image based on the partial area of the picked-up image, a composite image with the whole image as the main image and a composite image with the partial image as the main image when a still image shooting operation is performed after the part specification operation.

5. The mode setting method according to claim 4, comprising a step of a display control section displaying the whole image based on the picked-up image as a main image and displaying the partial image based on the partial area of the picked-up image as a sub-image when the control section accepts the part specification operation.

6. The mode setting method according to claim 5, wherein the display control section is capable of exchanging the main image and the sub-image for each other to display the images; and the recording section switches the main image and the sub-image to be recorded, to correspond to display by the display control section.

\* \* \* \* \*